United States Patent Office 3,274,182
Patented Sept. 20, 1966

3,274,182
PROCESS FOR REDUCING 19-METHYL-1,4-DIEN-3-ONES TO CORRESPONDING 19-NOR-3-OXY-1,3,5(10)-TRIENES
Hugh L. Dryden, Jr., Deerfield, and Gayle M. Webber, Evanston, Ill., assignors to G. D. Searle & Co., Chicago, Ill., a corporation of Delaware
No Drawing. Filed Dec. 24, 1964, Ser. No. 421,095
Claims priority, application Canada, Dec. 28, 1963, 892,254
20 Claims. (Cl. 260—239.55)

This application is a continuation-in-part of our co-pending application Serial No. 262,342 filed April 8, 1959.

This invention relates to a process for converting a steroidal 19-methyl-1,4-dien-3-one to the corresponding 19-nor-3-oxy-1,3,5(10)-triene via alkali metal. In particular, this invention relates to new and improved means of converting a 17-oxygenated androsta-1,4-dien-3-one to the corresponding 3-oxyestra-1,3,5(10)-triene whereby the androsta-1,4-dien-3-one, in which ketonic oxygen other than at 3 is preferably ketalized or comparably protected, is contacted in an inert solvent medium by alkali metal or, more desirably, the radical anion deriving from an adduct thereof with a polycyclic aromatic hydrocarbon such as biphenyl or naphthalene. A scavenger adapted to selectively react with the methyl alkali metal formed in process tends further to improve the yield.

Typical of 17-oxygenated androsta-1,4-dien-3-ones most advantageously converted to corresponding 3-oxyestra-1,3,5(10)-trienes by the disclosed process are androsta-1,4-diene-3,17-dione 17-ethylene, 17-propylene, 17-trimethylene, 17-(2′,2′-dimethyl)trimethylene, and like ketals of the formula

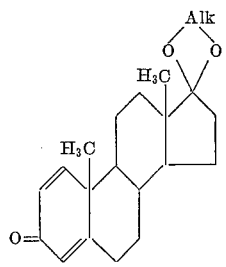

wherein Alk represents an alkylene radical so disposed as to form a 5- or 6-membered ring with the attached oxygen and carbon atom number 17 in the steroid nucleus; androsta-1,4-diene-3,17-dione 17,17-dialkyl ketals such as the 17,17-dimethyl ketal; the isomeric 17-ketals which derive upon substitution of glycerol for the diol in Examples 40A, 41A, and 42A hereafter; and optionally 17α-alkylated-17β-hydroxyandrosta-1,4-dien-3-ones and their 17-ethers of the formula

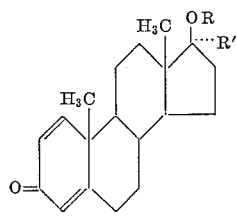

wherein R represents hydrogen or a tetrahydropyranyl radical and R′ represents hydrogen or a lower alkyl group such as methyl, ethyl, etc.

Other steroidal 19-methyl-1,4-dien-3-ones advantageously processed as described herein include 22α-spirosta-1,4-dien-3-one, 20-oxygenated pregna-1,4-dien-3-one ketals of the formula

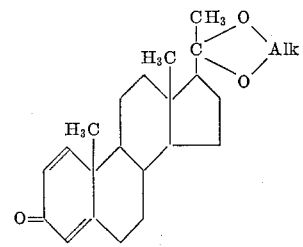

wherein Alk is defined as before, as also the corresponding 20,20-dialkyl ketals, and—indeed—substantially any steroidal 19-methyl-1,4-dien-3-one relatively impervious to prohibitive attack under the conditions of reaction set forth.

The 3-oxyestra-1,3,5(10)-trienes produced by the process

The 3-oxyestra-1,3,5(10)-trienes produced by the process of this invention, upon simple acidification, afford estra-1,3,5(10)-trien-3-ols of substantial commercial importance, among which estrone is especially valuable at present because of its use as the starting material in a wide variety of steroid syntheses.

Most of the estrone on the market today appears to have been made by pyrolysis of androsta-1,4-diene-3,17-dione. Perhaps because the most challenging aspect of the pyrolysis is rupture of the 19-methyl carbon-carbon bond, the involved process is not ordinarily regarded as reductive; but the fact is that two hydrogen atoms have to be supplied in order for the pyrolysis to proceed, as shown below:

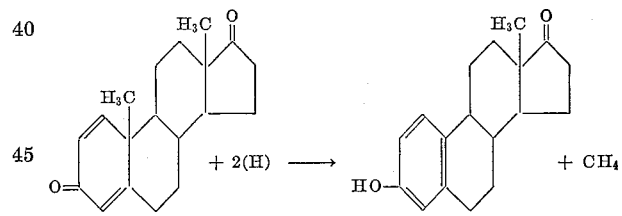

The added hydrogens come from the mineral oil or tetralin commonly used as a solvent for the pyrolysis. And viewed in this light, such solvent can be considered as a reducing agent catalyzed by heat.

It might be assumed, therefore, that other, purely chemical reducing agents would function alike to convert steroidal 19-methyl-1,4-dien-3-ones to corresponding 19-nor-3-oxy-1,3,5(10)-trienes; but the prior art shows this not to be true. Thus, noble metal catalyst hydrogenation results in random reduction of the ring A unsaturations; and another well-known chemical reducing system, alkali or alkaline earth metal in liquid ammonia, serves merely to hydrogenate the $\Delta^1$ double bond [Shapiro et al., Chemistry and Industry, 1962, 300] or, where lithium is the metal and the starting steroid 11-oxygenated, additionally acetylate ring A if the 11-substituent is an acetoxy group, and aromatize ring A with cleavage of ring B if it is oxygen [Tanabe et al., Tetrahedron Letters, No. 7, 601 (1961)].

Alcoholic zinc has been found to convert steroidal 19-methyl-1,4-dien-3-ones to corresponding 19-nor-3-oxy-1,3,5(10)-trienes provided a $\Delta^6$, $\Delta^8$, or $\Delta^{9(11)}$ double bond is present [U.S. 3,040,036], and so too has zinc in an aqueous aromatic base such as pyridine, picoline, lutidine, collidine, quinoline, etc. [U.S. 3,040,037]. On the other hand, when the latter reagent was used to reduce androsta-1,4-diene-3,17-dione, the major (80%) reaction product was the so-called cryptophenol, 1-hydroxy-3-methyl-estra-1,3,5(10)-trien-17-one, and only 4% estrone was isolable. [Tsuda et al., J. Org. Chem., 26, 2614 (1961)]. Moreover, zinc dust and acetic acid produced no ring A aromatization whatsoever in androsta-1,4-diene-3,17-dione, but instead afforded a substance assumed to be a bis compound showing polyene unsaturation [J. Org. Chem., loc. cit.].

It follows that the process here sought to be patented is unforeshadowed by the prior art, and the high yields of pure products which characterize preferred embodiments of the invention are entirely unexpected.

As indicated above, there is substantially no limit to the variety of steroids which can be used as starting materials in the subject process so long as they are 19-methyl-1,4-dien-3-ones wherein no other function is subject to undesirable reduction or would otherwise interfere with the contemplated reaction—for example, by being unstable under the strongly alkaline conditions which prevail. In the case of androsta-1,4-diene-3,17-dione and comparable polyones, ketalization of the potentially interfering keto substituents serves admirably to protect against inimical side reactions, since the ketal group is notably stable to reduction and alkali. Moreover, it has the advantage of being readily removed by acid hydrolysis. Those skilled in the art will of course appreciate that other chemical groups possessed of the indicated properties likewise would afford the required protection.

Among the various alkali metals with which steroidal 19-methyl-1,4-dien-3-ones can be reduced to corresponding 19-nor-3-oxy-1,3,5(10)-trienes as described herein, lithium has generally been the one of choice to date, although sodium and potassium also are most effective in selected instances, as are mixtures of these metals—for example, sodium and potassium alloy. Thus, when the metal is used "directly" (which is to say in the absence of a polycyclic aromatic hydrocarbon such as biphenyl or naphthalene with which it forms an adduct), better yields of 19-nor-3-oxy-1,3,5(10)-triene are often achieved with potassium or sodium and potassium alloy than with lithium or sodium alone, possibly because the former are liquids at usual operating temperatures in preferred solvents such as tetrahydrofuran, and so make better contact with the steroid to be reduced. The high melting points of lithium and sodium militate against their being molten in most organic solvents at less than supra-reflux temperatures. The same is true of alloys of lithium and sodium or—by and large—lithium and potassium, so that such mixtures, like a lithium, sodium, and potassium alloy are ordinarily operable without being specifically advantageous. Contact with the solid metals or mixtures thereof can of course be improved by introducing them in a finely-divided state, but the surfaces tend rapidly to tarnish as reduction proceeds.

So it is that the well-known insolubility of alkali metals per se in organic solvents broadly constiutes a substantial deterrent to their "direct" use. Instead, it is preferred to employ the metals in the presence of polycyclic aromatic hydrocarbons such as biphenyl or naphthalene with which they form soluble adducts [Scott et al.: U.S. 2,019,832, U.S. 2,023,793, U.S. 2,027,000, U.S. 2,048,169, U.S. 2,054,303, and J. Amer. Chem. Soc., 58, 2442 (1936)], since it turns out that the radical anions deriving from such adducts not only share, but in certain instances far exceed, the capacity of the metals themselves to effect desired reductions in maximum yields of purest products. Derivation of these radical anions can be graphically represented thus

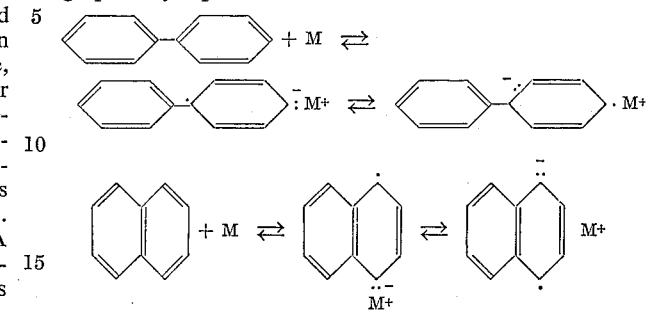

etc., M being taken to represent the alkali metal. Illustrative of polycyclic aromatic hydrocarbons other than biphenyl and naphthalene adapted to form suitably ionizing adducts as disclosed herein are methylnaphthalene (both isomers), dimethylnaphthalene (10 isomers), phenanthrene, terphenyl (3 isomers), anthracene, acenaphthene, and fluoranthene. A few oxygen-containing polycyclic aromatic compounds likewise form such adducts—for example, dibenzofuran and benzophenone. Among these various substances, which are hereinafter termed "radical anion precursors," a sub-group consisting of biphenyl, naphthalene, methylnaphthalene, phenanthrene, and terphenyl is characterized by so superior a performance in the process of this invention as to dictate separate recognition. Thus, for example, when androsta-1,4-diene-3,17-dione 17-ethylene ketal is reduced with lithium in the presence of one of the latter, especially preferred radical anion precursors, using tetrahydrofuran as a solvent, the yields of estrone isolable upon acidification consistently range upward of 68% under optimum conditions, whereas other radical anion precursors (and, indeed, alkali metals alone) in comparable operations afford yields of estrone ranging downward from 17%.

Of critical importance to the contemplated adduct formation is the solvent in which formation is undertaken. Notwithstanding, a wide range of preponderantly ethereal solvents suggest themselves for this particular purpose [Cf. Scott et al., loc. cit.]. These include lower aliphatic ethers such as dimethyl ether, methyl ethyl ether, methyl propyl ether, methyl isopropyl ether, and methylvinyl ether; fully alkylated polyhydric alcohols such as ethylene glycol dimethyl ether, ethylene glycol methyl ethyl ether, ethylene glycol diethyl ether, ethylene glycol methyl butyl ether, ethylene glycol ethyl butyl ether, ethylene glycol dibutyl ether, diethylene glycol dimethyl ether, diethylene glycol methyl ethyl ether, triethylene glycol dimethyl ether, tetraethylene glycol dimethyl ether, propylene glycol dimethyl ether, dipropylene glycol dimethyl ether, glycerol trimethyl ether, glycerol dimethyl ethyl ether; acetals such as methylal, glycol formal, and glycerol formal methyl ether; cyclic ethers such as dioxane, tetrahydrofuran, methyltetrahydrofuran, tetrahydropyran, methyl tetrahydrofurfuryl ether, dimethylenepentaerythritol, and N,N-dimethyltetrahydrofurfurylamine; etc. Strictly tertiary amines such as trimethylamine and lower alkyl esters of ortho acids such as methyl orthoformate and ethyl orthoformate have also been used. Moreover, potassium, as distinct from lithium and to a lesser extent sodium, readily forms adducts in such solvents as diethyl ether, dibutyl ether, and even benzene. Substantial amounts of other relatively inert organic solvents—e.g., toluene, xylene, mineral oil, etc.—may be present without destroying the capacity of the foregoing materials to promote adduct formation.

Despite the widespread operability of preponderantly ethereal solvents with respect to adduct formation, it will be clear to those skilled in the art that not all such solvents function equally well as media for the claimed reduction, since not only does their aptitude relate—among other things—to the metal involved, but also to the operating temperature in prospect. (Most of the lower aliphatic ethers referred to boil at less than 35°.) And acetals are hydrolyzed by the acid ordinarily introduced after reduction is complete, thereby complicating work-up. Further, the high reactivity of alkali metal, and the organometallic compounds and radical anions deriving therefrom, practically guarantees that not all of the foregoing solvents will be totally impervious to attack thereby under all conceivable conditions of use; and their susceptibility to attack is obviously inherently various. Finally, it is necessary that the solvent of choice be free from contaminants which inhibit adduct formation; and the accessibility of such purity likewise varies. Thus, whereas commercial tetrahydrofuran serves admirably as a solvent without any refinement whatever, commercial ethylene glycol dimethyl ether is commonly distilled several times over sodium to render it fit for use and dibutyl ether, in addition, is preliminarily distilled from a mixture of alumina and sodium hydroxide. Most suitable of the various ethereal solvents evaluated, for the purposes of this invention, are tetrahydrofuran and ethylene glycol dimethyl ether (more efficiently named "1,2-dimethoxyethane") admixed, if indicated, with such minor amounts of benzene or like relatively inert organic solvents as may be desirable to insure solubility of the reactants at selected operating temperatures.

The desirability of a scavenger for the methyl alkali metal which is a by-product of the instant process stems from the disposition of the latter to add to the 3-keto group of the steroid being reduced, and is proportional to the rate of the addition relative to the reduction. In principle, two types of compounds can be used as scavengers: those containing functional groups which add to the methyl alkali metal, and those containnig acidic hydrogen atoms which protonate it. In either case, however, the reaction of the scavenger with the methyl alkali metal must be "selective"—which is to say that both reagents must react appreciably faster with each other than with anything else present in the reaction mixture. Moreover, an effective protonating type scavenger for present purposes is necessarily one which will not itself be converted in the course of the protonation to an organometallic compound capable of interfering addition to the 3-keto group being reduced. Scavengers best adapted to meet these criteria are bulky molecules containing weakly acidic hydrogen atoms such as diphenylmethane and methylnaphthalene. Homologs thereof wherein one or more alkyl groups replace hydrogen, either on the benzene ring(s) or in the side chain(s), also will serve.

Operating temperatures are largely acritical, albeit intense cold (e.g., −35°) is not conductive to maximum yields in minimal times; and heating above the boiling point of the reaction mixture tends to be inconvenient. Accordingly, and because within the preferred range thus contemplated higher rather than lower temperatures are more often advantageous, the process is commonly carried out at reflux. One exception to the usual practice is made where the radical anion deriving from an adduct of lithium an dibenzofuran in tetrahydrofuran is involved, because two such adducts are possible and only the (green) one which forms at around 25°—in contradistinction to the (red) one which forms at temperatures approaching the boiling point of the solvent—affords a radical anion.

Various proportions of materials are operable in the process; but certain generalizations with respect to optimum yield, and relative in each instance to the reduction of 1 mole of 19-methyl-1,4-dien-3-one, are in point: Whereas two gram-atoms of alkali metal are theoretically ideal, 3-4.5 gram-atoms (depending on surface area and the size of the run) are more often preferable in practice. And although merely a trace of radical anion precursor would be ample in the sense that it is not consumed in the reaction, 2 moles of precursor are favored as a convenient means of inducing a desirably rapid build-up of radical anion concentration, though 1 mole will probably serve as well if the alkali metal be sufficiently finely-divided. Approximately 1 mole of scavenger is preferred, while the optimum amount of solvent is largely conditioned by the particular reactants involved. The reduction of androsta-1,4-diene-3,17-dione 17-ethylene ketal with lithium and biphenyl in the presence of diphenylmethane, using tetrahydrofuran as solvent, is perhaps most advantageously carried out in 6–10 volumes of solvent, roughly 3 of which are required to dissolve the ketal.

The build-up of radical anion concentration above recommended is corollary to the fact that a continuous excess of reducing agent in every part of the reaction mixture minimizes the opportunity for methyl alkali metal to add to the 3-keto group. And it is on this basis, too, that a preferred technique calls for adding 19-methyl-1,4-dien-3-one to alkali metal or radical anion, rather than vice versa.

Throughout the course of the reduction, maximally efficient mixing is maintained; and the reaction mixture is protected at all times by an inert atmosphere.

The 19-nor-3-oxy-1,3,5(10)-triene produced by the instant process is a salt which, using the reduction of androsta-1,4-dien-3-one 17-ethylene ketal as a prototype, can be enformulated thus

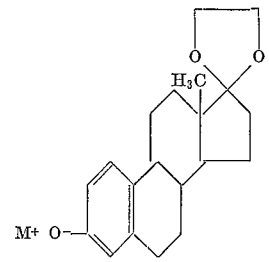

M+ being the cation of the alkali metal employed. Such salts are not ordinarily isolated as such, but instead are converted to corresponding phenols by acidification. Work-up of the reaction mixture to this end can be accomplished substantially as follows: Organometallic compounds and excess alkali metal are destroyed by the consecutive addition of excess methanol and water. When no more metal remains, an excess of mineral acid is introduced and, if ketal groups be present, hydrolysis is assured by warming the reactants briefly. Organic solvent is next removed by vacuum distillation, leaving an aqueous suspension which, assuming a preferred embodiment of the invention whereby lithium-biphenyl radical anion was the reducing agent in tetrahydrofuran solvent and with diphenylmethane as scavenger, comprises estrone, biphenyl and diphenylmethane. The suspension is triturated with benzene, following which an equal volume of hexane is added and the resultant mixture allowed to stand until precipitation of estrone is complete. The estrone is isolated by filtration; further purified by washing with 1:1 benzene-hexane, methanol, and water; and dried in hot air. An additional crop of product can be isolated by extracting the combined organic filtrates with aqueous potassium hydroxide and acidifying the extract.

The following examples describe in detail various applications of the process of this invention in illustrative situations. However, the invention is not to be construed as limited thereby, either in spirit or in scope, since it will be apparent to those skilled in the art that many modifications, both of materials and of techniques, may be practiced without departing from the purpose and intent of this disclosure. In the examples hereinafter set forth, temperatures are given in degrees centigrade and relative amounts of materials in parts by weight, except as otherwise noted.

Example 1

To a mixture of approximately 200 parts of a 50% dispersion of lithium in mineral oil and 5400 parts of tetrahydrofuran at the boiling point under reflux in a nitrogen atmosphere is added, with agitation during 10 minutes, a solution of 328 parts of androsta-1,4-diene-3,17-dione 17-ethylene ketal in 1475 parts of tetrahydrofuran. Boiling under reflux with agitation is continued for 1 hour longer, whereupon 800 parts of methanol, 2000 parts of water, and 1190 parts of concentrated hydrochloric acid is consecutively mixed in, the nitrogen atmosphere being maintained throughout. The resultant mixture is warmed for half an hour, whereupon solvent is removed by vacuum distillation and the residue extracted with benzene. The benzene extract is in turn extracted with aqueous 5% potassium hydroxide. From the potassium hydroxide extract, on acidification, estrone precipitates. Isolated by filtration, washed with water, and dried in air, the product melts at 249–252° (corr.).

Example 2

To a dispersion of 150 parts of sodium in 870 parts of xylene at 60° is added 4500 parts of tetrahydrofuran. The resultant mixture is heated at the boiling point under reflux in a nitrogen atmosphere with agitation for 70 minutes, during the first 10 of which a solution of 328 parts of androsta-1,4-diene-3,17-dione 17-ethylene ketal in 1475 parts of tetrahydrofuran is introduced. Work-up precisely as described in Example 1 affords estrone melting at 251–255° (corr.).

Example 3

To a mixture of 250 parts of potassium and 2700 parts of tetrahydrofuran at the boiling point under reflux in a nitrogen atmosphere is added, with agitation and in the course of 20 minutes, a solution of 328 parts of androsta-1,4-diene-3,17-dione 17-ethylene ketal in 1475 parts of tetrahydrofuran. During the addition, the color of the reaction mixture ranges from light green to brown. Boiling under reflux with agitation is continued for 1 hour longer, whereupon work-up as described in Example 1 affords estrone melting at 234–239° (corr.).

Example 4

To a finely-divided suspension of 140 parts of sodium and 240 parts of potassium in 5400 parts of tetrahydrofuran at the boiling point under reflux in a nitrogen atmosphere is added, with agitation during 45 minutes, a solution of 500 parts of androsta-1,4-diene-3,17-dione 17-ethylene ketal in 2250 parts of tetrahydrofuran. A light green color prevails throughout. Boiling under reflux with agitation is continued for a few minutes longer, whereupon 800 parts of methanol, 2000 parts of water, and 1490 parts of concentrated hydrochloric acid is consecutively mixed in, the nitrogen atmosphere being maintained throughout. Solvent is then removed by vacuum distillation, and the residue is extracted with benzene. The benzene extract is in turn extracted with aqueous 5% potassium hydroxide. From the potassium hydroxide extract, on acidification, estrone precipitates. Isolated by filtration, washed with water, and dried in air, the product melts at 248–252° (corr.).

Example 5

A mixture of 71 parts of lithium wire cut in ¼" lengths, 941 parts of biphenyl, and approximately 11,000 parts of tetrahydrofuran is heated to boiling under reflux with agitation in a nitrogen atmosphere while a deep green color develops. Boiling under reflux with agitation and protected by nitrogen is continued while a solution of 1000 parts of androsta-1,4-diene-3,17-dione 17-ethylene ketal in 5400 parts of tetrahydrofuran is introduced at a rate such that the green color is never discharged (30 minutes required), and for 10 minutes thereafter. Then, 1580 parts of methanol, 3000 parts of water, and 1785 parts of concentrated hydrochloric acid are consecutively mixed in under nitrogen. The resultant mixture is warmed at around 60° for 30 minutes, following which it is stripped of solvent by vacuum distillation. The residue is suspended in 2250 parts of benzene, whereupon 1750 parts of hexane is mixed in and the mixture allowed to stand while estrone separates. The estrone, isolated by filtration, washed with methanol and water, and dried in warm air, melts at 251–256° (corr.). Extraction of the combined filtrate and washes with aqueous potassium hydroxide, followed by acidification of the extract, affords additional product.

Example 6

A mixture of 51 parts of lithium wire cut in ¼" lengths, 950 parts of biphenyl, and approximately 5400 parts of tetrahydrofuran is heated to boiling under reflux with agitation in a nitrogen atmosphere while a deep green color develops. Boiling under reflux with agitation and protected by nitrogen is continued while a solution of 1000 parts of androsta-1,4-diene-3,17-dione 17-ethylene ketal in 3600 parts of tetrahydrofuran is introduced during 1 hour, care being taken that the green color is always present throughout the reaction mixture in process. Thereupon, 790 parts of methanol, 2000 parts of water, and 1785 parts of concentrated hydrochloric acid are consecutively mixed in under nitrogen; and the mixture thus obtained is worked up as described in Example 5 to give estrone melting at 248–254° (corr.).

Example 7

A procedure identical with that of Example 6 except that addition of ketal is effected in 10 minutes rather than 1 hour affords estrone melting at 244–252° (corr.).

Example 8

A mixture of 14 parts of lithium wire cut in ¼" lengths, 114 parts of biphenyl, and approximately 3400 parts of tetrahydrofuran is heated to boiling under reflux with agitation in a nitrogen atmosphere while a deep green color develops. Boiling under reflux with agitation and protected by nitrogen is continued while a solution of 164 parts of androsta-1,4-diene-3,17-dione 17-ethylene ketal in approximately 1400 parts of tetrahydrofuran is added in the course of 25 minutes, the addition being initially so rapid as to discharge the green color but thereafter slowed to the point where a yellow color prevails. Boiling under reflux with agitation and protected by nitrogen is still further continued for 25 minutes, during which time the green color reappears. Then, 160 parts of methanol, 400 parts of water, and 360 parts of concentrated hydrochloric acid are mixed in under nitrogen; and the resultant mixture is warmed at around 60° for 30 minutes. Solvent is removed by vacuum distillation. The residue is suspended in 440 parts of benzene, whereupon 350 parts of hexane is stirred in. No solid estrone separates. The mixture is extracted with aqueous 5% potassium hydroxide. Acidification affords estrone which, filtered off, washed with methanol, and dried in air, melts at 248–253°. The yield is substantially lower than that obtained by the procedures of Examples 5–7.

Example 9

A mixture of 39 parts of potassium, 160 parts of biphenyl, and 900 parts of tetrahydrofuran is heated to boiling under reflux with agitation in a nitrogen atmosphere while a deep blue-green color develops. Boiling under reflux with agitation and protected by nitrogen is continued while a solution of 160 parts of androsta-1,4-diene-3,17-dione 17-ethylene ketal in 675 parts of tetrahydrofuran is introduced at a rate such that the blue-green color is never discharged (10 minutes required), and for 10 minutes thereafter. Then, 160 parts of methanol, 400 parts of water, and approximately 240 parts of concentrated hydrochloric acid are consecutively mixed in under nitrogen. The resultant mixture is warmed at around 60° for 30 minutes, following which it is stripped of solvent by vacuum distillation. The residue is supended in 450 parts of benzene, whereupon 660 parts of hexane is mixed in and the mixture allowed to stand briefly while estrone separates. The estrone, isolated by filtration, washed with methanol, and dried in warm air, melts at 246–252° (corr.). Extraction of the combined filtrate and wash with aqueous potassium hydroxide, followed by acidification of the extract, affords additional product.

*Example 10*

A mixture of approximately 29 parts of sodium, 74 parts of potassium, 156 parts of biphenyl, and 900 parts of tetrahydrofuran is heated to boiling under reflux with agitation in a nitrogen atmosphere while a green color develops. Boiling under reflux with agitation and protected by nitrogen is continued while a solution of 164 parts of androsta-1,4-diene-3,17-dione 17-ethylene ketal in approximately 720 parts of tetrahydrofuran is introduced at a rate such that the green color is never discharged (30 minutes required), whereupon 400 parts of methanol, 500 parts of water, and approximately 300 parts of concentrated hydrochloric acid are consecutively mixed in under nitrogen. The resultant mixture is warmed briefly, following which it is stripped of solvent by vacuum distillation. The residue is mixed with 1750 parts of ether and the insoluble estrone filtered from the mixture, washed on the filter with methanol, and dried in warm air. The combined filtrate and wash is extracted with aqueous 5% potassium hydroxide. Acidification affords additional estrone. The product melts at 244–252° (corr.).

*Example 11*

A mixture of 5 parts of lithium wire cut in ¼″ lengths, 78 parts of naphthalene, and 270 parts of tetrahydrofuran is heated to boiling under reflux with vigorous agitation in a nitrogen atmosphere while a deep green color develops. Boiling under reflux with vigorous agitation and protected by nitrogen is continued while a solution of 100 parts of androsta-1,4-diene-3,17-dione 17-ethylene ketal in 360 parts of tetrahydrofuran is introduced at a rate such that the green color is never discharged, 10 minutes being required. Then, 160 parts of methanol, 300 parts of water, and approximately 180 parts of concentrated hydrochloric acid are consecutively mixed in under nitrogen. The resultant mixture is warmed at around 60° for 30 minutes, following which it is stripped of solvent by vacuum distillation. The residue is suspended in 225 parts of benzene, whereupon approximately 175 parts of hexane is mixed in and the mixture allowed to stand briefly while estrone separates. The estrone, isolated by filtration, washed with methanol and water, and dried in warm air, melts at 250–253° (corr.). Extraction of the combined filtrate and washes with aqueous potassium hydroxide, followed by acidification of the extract, affords additional product.

*Example 12*

A mixture of 14 parts of sodium, 42 parts of napthalene, and 540 parts of tetrahydrofuran is heated to boiling under reflux with vigorous agitation in a nitrogen atmosphere while a green color develops. Boiling under reflux with vigorous agitation and protected by nitrogen is continued while a solution of 50 parts of androsta-1,4-diene-3,17-dione 17-ethylene ketal in 225 parts of tetrahydrofuran is introduced at a rate such that the green color is never discharged, about 10 minutes being required. Then, 40 parts of methanol, 100 parts of water, and 120 parts of concentrated hydrochloric acid are consecutively mixed in under nitrogen. The resultant mixture is warmed at around 60° for 30 minutes, following which it is stripped of solvent by vacuum distillation. The residue is suspended in 135 parts of benzene, whereupon 105 parts of hexane is mixed in and the mixture allowed to stand while estrone separates. The estrone, isolated by filtration, washed with methanol, and dried in warm air, melts at 239–245° (corr.). Extraction of the combined filtrate and wash with aqueous potassium hydroxide, followed by acidification of the extract, affords additional product.

*Example 13*

A mixture of 7 parts of lithium wire cut in ¼″ lengths, 85 parts of redistilled 1-methylnaphthalene, and 540 parts of tetrahydrofuran is heated to boiling under reflux with vigorous agitation in a nitrogen atmosphere while a green color develops. Boiling under reflux with vigorous agitation and protected by nitrogen is continued while a solution of 50 parts of androsta-1,4-diene-3,17-dione 17-ethylene ketal in 225 parts of tetrahydrofuran is introduced at a rate such that the green color is never discharged (35 minutes required), and for 10 minutes thereafter. Then, 80 parts of methanol, 200 parts of water, and approximately 110 parts of concentrated hydrochloric acid are consecutively mixed in under nitrogen. The resultant mixture is warmed at around 60° for 30 minutes, following which it is stripped of solvent by vacuum distillation. The residue is suspended in 90 parts of benzene whereupon 104 parts of hexane is mixed in and the mixture allowed to stand overnight while estrone separates. The estrone, isolated by filtration, washed with methanol, and dried in warm air, melts at 250–256° (corr.). Extraction of the combined filtrate and wash with aqueous potassium hydroxide, followed by acidification of the extract, affords additional product. Total yield is approximately 74% of theory.

*Example 14*

A mixture of 14 parts of lithium wire cut in ¼″ lengths, 172 parts of dibenzofuran, and approximately 1700 parts of tetrahydrofuran is maintained with vigorous agitation at room temperatures under nitrogen until a green color develops. A solution of 164 parts of androsta-1,4-diene-3,17-dione 17-ethylene ketal in 900 parts of tetrahydrofuran is thereupon introduced, under nitrogen, at a rate such that the green color is never discharged. Agitation under nitrogen at room temperatures is continued for 30 minutes following completion of the addition, at which point 800 parts of methanol, 2000 parts of water, and approximately 600 parts of concentrated hydrochloric acid are consecutively mixed in under nitrogen. The resultant mixture is warmed at around 60° for 30 minutes, following which it is stripped of solvent by vacuum distillation. The residue is suspended in 3500 parts of ether and the suspension allowed to stand briefly until no more estrone separates. The estrone, isolated by filtration, washed with methanol and water, and dried in warm air, melts at 264–266°. Extraction of the combined filtrate and washes with aqueous potassium hydroxide, followed by acidification of the extract, affords additional product melting at 245–250°.

*Example 15*

A mixture of 7 parts of lithium wire cut in ¼″ lengths, 85 parts of 1-methylnaphthalene, 52 parts of diphenylmethane, and 540 parts of tetrahydrofuran is heated to boiling under reflux with vigorous agitation in a nitrogen atmosphere while a deep green color develops. Boiling under reflux with vigorous agitation and protected by nitrogen is continued while a solution of 50 parts of androsta-1,4-diene-3,17-dione 17-ethylene ketal in 225 parts of tetrahydrofuran is introduced at a rate such that the green color is never discharged (30 minutes required), and for 10 minutes thereafter. Then, 80 parts of methanol, 200 parts of water, and 150 parts of concentrated hydrochloric acid are consecutively mixed in under nitrogen. The resultant mixture is warmed at around 60° for 30 minutes, following which it is stripped of solvent by vacuum distillation. The residue is suspended in 90 parts of benzene, whereupon approximately 105 parts of hexane is mixed in and the mixture allowed to stand briefly while estrone separates. The estrone, isolated by filtration, washed with methanol, and dried in warm air, melts at 248–252° (corr.). Extraction of the combined filtrate and wash with aqueous potassium hydroxide, followed by acidification of the extract, affords additional product. The total yield is 82% of theory.

*Example 16*

A mixture of 31 parts of lithium wire cut in ¼" lengths, 850 parts of 2-methylnaphthalene, 260 parts of diphenylmethane, and 5400 parts of tetrahydrofuran is heated to boiling under reflux with vigorous agitation in a nitrogen atmosphere while a deep green color develops. Boiling under reflux with vigorous agitation and protected by nitrogen is continued while a solution of 500 parts of androsta-1,4-diene-3,17-dione 17-ethylene ketal in 2250 parts of tetrahydrofuran is introduced at a rate such that the green color is always present, approximately 30 minutes being required. Consecutive introduction of 800 parts of methanol, 2000 parts of water, and 1500 parts of concentrated hydrochloric acid under nitrogen, followed by warming at around 60° for 30 minutes and subsequent stripping of solvent by vacuum distillation, affords residue which is suspended in benzene. From the benzene suspension, insoluble estrone is separated by filtration, washed with methanol, and dried in air. Extraction of the combined filtrate and wash with aqueous potassium hydroxide, followed by acidification of the extract, affords additional product. Total yield is approximately 83% theory.

*Example 17*

To a solution of 660 parts of biphenyl and 364 parts of diphenylmethane in approximately 3800 parts of tetrahydrofuran under nitrogen is added 44 parts of lithium wire cut in ¼" lengths. A dark green color rapidly appears on the freshly-cut surfaces of the lithium. The mixture is refluxed under nitrogen with vigorous agitation until the green color permeates the reaction mixture, at which point a solution of 700 parts of androsta-1,4-diene-3,17-dione 17-ethylene ketal in approximately 2100 parts of warm tetrahydrofuran is introduced during approximately 70 minutes, the addition rate being so controlled as to insure that the green color is maintained at all times. Heat is evolved. When addition of the ketal solution is complete, reflux under nitrogen with vigorous agitation is continued for 15 minutes, whereupon 560 parts of methanol is cautiously added (with agitation under nitrogen). After approximately half the methanol has been added, the reaction mixture becomes quite thick, thinning out again as the balance is introduced. Much heat is evolved. Approximately 1400 parts of water is next cautiously added (with agitation under nitrogen), the viscosity of the reaction mixture tending to vary as during the methanol addition. Initially, substantial heat is evolved. When all of the water has been added, approximately 800 parts of concentrated hydrochloric acid is cautiously mixed in. Sufficient heat is evolved to bring the mixture to boiling. The mixture is maintained with agitation at the elevated temperature for 30 minutes, then freed of tetrahydrofuran and methanol by vacuum distillation. The mushy residue is suspended in approximately 1500 parts of benzene, care being taken that no large lumps remain. Then approximately 1100 parts of hexane is stirred in. When separation of estrone from the mixture is complete, it is filtered off and consecutively rinsed with 1:1 benzene-hexane, methanol, water, and methanol. Dried in warm air, the product melts at 258–261°. The filtrate is diluted with water and the benzene-hexane layer separated and extracted with aqueous 5% potassium hydroxide. Acidification of this extract affords additional estrone melting at 260–265°. By the foregoing procedure, yields of pure product ranging upward of 77% theory are achieved.

*Example 18*

A scrupulously cleaned and dried stainless steel reactor is charged with 20,800 parts of biphenyl, 11,480 parts of diphenylmethane, and approximately 120,000 parts of tetrahydrofuran. The reactor is evacuated and purged with nitrogen. All subsequent operations down to and including acidification are conducted in a nitrogen atmosphere with vigorous agitation. The reaction mixture is heated to reflux, whereupon heating is stopped and 46,040 parts of a 30% dispersion of lithium in paraffin is charged portionwise, small increments being added until the mixture turns green and the balance being added as rapidly as foaming will permit. A solution of 22,050 parts of androsta-1,4-diene-3,17-dione 17-ethylene ketal in 63,000 parts of hot tetrahydrofuran is filtered and divided in halves. The first half is charged as rapidly as maintenance of the green color (and a considerable heat effect) will permit, whereupon 2300 parts of a 30% dispersion of lithium in paraffin is charged as rapidly as possible in view of the foaming previously noted. The reaction mixture is then reheated to reflux and the balance of the ketal solution charged again, as rapidly as is consistent with the maintenance of the green color. Reflux is continued for 15 minutes, at which point 2800 parts of methanol is cautiously added, followed by 70,000 parts of water. The reaction mixture is then transferred to a glass-lined still pot and acidified with approximately 45,800 parts of concentrated hydrochloric acid. The resultant mixture is heated at near boiling for 30 minutes with agitation, then freed of tetrahydrofuran and methanol by vacuum distillation. The aqueous phase is decanted from the residue, and the granular solids are mixed with approximately 49,000 parts of benzene during 10 minutes. This mixture in turn is mixed with approximately 37,000 parts of hexane for 10 minutes; and the resultant mixture is allowed to stand overnight. The insoluble estrone is filtered off and washed on the filter with 1:1 benzene-hexane, then slurried with methanol and again isolated by filtration. Additional estrone is obtained by extracting the combined filtrates and washes with aqueous potassium hydroxide and acidifying the extract.

*Example 19*

A mixture of 7 parts af lithium wire cut in ¼" lengths, 100 parts of biphenyl, and 540 parts of tetrahydrofuran is heated to boiling under reflux with vigorous agitation in a nitrogen atmosphere while a green color develops. Boiling under reflux with vigorous agitation and protected by nitrogen is continued while a solution of 50 parts of androsta-1,4-diene-3,17-dione 17-ethylene ketal and 204 parts of diphenylmethane in 225 parts of tetrahydrofuran is added at a rate such that the green color is not discharged, approximately 25 minutes being required. Consecutive addition under nitrogen of 80 parts of methanol, 200 parts of water, and approximately 85 parts of concentrated hydrochloric acid, followed by heating at approximately 60° for 30 minutes and subsequent removal of solvent by vacuum distillation, affords a residue which is taken up in 180 parts of benzene. Approximately 210 parts of hexane is mixed in and the mixture allowed to stand while estrone separates. Isolated by filtration, washed on the filter with methanol and then with water, and dried in warm air, the product melts at 250–260° (corr.).

*Example 20*

A mixture of 10 parts of lithium wire cut in ¼" lengths, 100 parts of biphenyl, 51 parts of diphenylmethane, and approximately 1100 parts of tetrahydrofuran is heated to boiling under reflux with vigorous agitation in a nitrogen atmosphere while a deep blue-green color develops. Boiling under reflux with vigorous agitation and protected by nitrogen is continued while a solution of 100 parts of androsta-1,4-diene-3,17- dione 17-ethylene ketal in 450 parts of tetrahydrofuran is introduced at a rate such that the blue-green color remains undischarged (approximately 30 minutes), and for a few minutes longer. Then, 160 parts of methanol, 300 parts of water, and 150 parts of concentrated hydrochloric acid are consecutively mixed in under nitrogen. The resultant mixture is warmed at around 60° for 30 minutes, following which it is stripped of solvent by vacuum distillation. The residue is mixed with 210 parts of ether. Estrone is separated therefrom by filtration. The product is further purified by rinsing with methanol.

*Example 21*

Substitution of 12 parts of lithium and 204 parts of diphenylmethane for the 10 parts of lithium and 51 parts of diphenylmethane called for in the preceding Example 20 affords, by the procedure there detailed, substantially the same yield and purity of estrone.

*Example 22*

A mixture of 6 parts of lithium wire cut in ¼″ lengths, 25 parts of biphenyl, 26 parts of diphenylmethane, and 270 parts of tetrahydrofuran is heated to boiling under reflux with vigorous agitation in a nitrogen atmosphere while a deep green color develops. Boiling under reflux with vigorous agitation and protected by nitrogen is continued while a solution of 50 parts of androsta-1,4-diene-3,17-dione 17-ethylene ketal in 225 parts of tetrahydrofuran is introduced at a rate such that the green color is not discharged (approximately 30 minutes required), and for 10 minutes thereafter. Then, 80 parts of methanol, 200 parts of water, and 150 parts of concentrated hydrochloric acid are consecutively mixed in under nitrogen. The resultant mixture is warmed at around 60° for a few minutes, following which it is stripped of solvent by vacuum distillation. The residue is suspended in 680 parts of heptane and the suspension allowed to stand while estrone separates. The product is filtered off, washed on the filter with methanol, and dried in air.

*Example 23*

A mixture of 21 parts of lithium wire cut in ¼″ lengths, 250 parts of biphenyl, 260 parts of diphenylmethane, and 1350 parts of tetrahydrofuran is heated to boiling under reflux with vigorous agitation in a nitrogen atmosphere while a green color develops. Boiling under reflux with vigorous agitation and protected by nitrogen is continued while a solution of 500 parts of androsta-1,4-diene-3,17-dione 17-ethylene ketal in 2250 parts of tetrahydrofuran is added at a rate such that the green color is not discharged (25 minutes required), and for 10 minutes thereafter. Then, 800 parts of methanol, 2000 parts of water, and 1800 parts of concentrated hydrochloric acid are consecutively mixed in under nitrogen. The resultant mixture is warmed at around 60° for 30 minutes, following which it is stripped of solvent by vacuum distillation. The residue is suspended in approximately 1400 parts of heptane. The suspension is set aside until no more estrone separates, whereupon the product is isolated by filtration, washed on the filter with methanol, and dried in warm air. It melts at 240–250° (corr.).

*Example 24*

Approximately 28 parts of lithium, 470 parts of biphenyl, 260 parts of diphenylmethane, and 4500 parts of tetrahydrofuran are mixed at room temperature under nitrogen and held there with vigorous agitation while a deep green color develops. The mixture is then cooled to −35° and maintained thereat with vigorous agitation under nitrogen while a solution of 500 parts of androsta-1,4-diene-3,17-dione 17-ethylene ketal in 2700 parts of tetrahydrofuran is added at a rate such that the green color is not discharged. Then, 2400 parts of methanol, 2000 parts of water, and 600 parts of concentrated hydrochloric acid are consecutively mixed in under nitrogen; and the resultant mixture is warmed at around 60° for 30 minutes, following which it is stripped of solvent by vacuum distillation. The residue is consecutively mixed with 1170 parts of benzene and 910 parts of hexane. No estrone separates at this point. Extraction with aqueous 5% potassium hydroxide and acidification of the extract affords an insubstantial yield of estrone.

*Example 25*

Approximately 26 parts of lithium wire cut in ¼″ lengths, 386 parts of biphenyl, 220 parts of diphenylmethane, and 2250 parts of tetrahydrofuran are mixed at room temperature under nitrogen and held there with vigorous agitation until a deep green color develops. The mixture is then cooled to 0° and maintained thereat with vigorous agitation under nitrogen while a solution of 400 parts of androsta-1,4-diene-3,17-dione 17-ethylene ketal in 1350 parts of tetrahydrofuran is added at a rate such that the green color is not discharged (approximately 30 minutes required). Then, 2400 parts of methanol, 2000 parts of water, and 600 parts of concentrated hydrochloric acid are consecutively mixed in under nitrogen. The resultant mixture is warmed at around 60° for 30 minutes, following which it is stripped of solvent by vacuum distillation. The residue is consecutively mixed with 1170 parts of benzene and 910 parts of hexane. Insoluble solids (in this instance not estrone) are filtered off and discarded, and the filtrate is extracted with aqueous 5% potassium hydroxide. Acidification of the potassium hydroxide extract affords a relatively low yield of crude estrone as a precipitate which, filtered off and dried in air, melts at 245–258°.

*Example 26*

Approximately 63 parts of lithium wire cut in ¼″ lengths, 940 parts of biphenyl, 520 parts of diphenylmethane, and 5400 parts of tetrahydrofuran are mixed at 18–20° under nitrogen to form a deep green solution and maintained thus with vigorous agitation during addition of a solution of 1000 parts of androsta-1,4-diene-3,17-dione 17-ethylene ketal in approximately 2900 parts of warm tetrahydrofuran at a rate such that the green color is never discharged (30 minutes required). The described conditions are further maintained for 30 minutes, whereupon 800 parts of methanol, 2000 parts of water, and 1200 parts of concentrated hydrochloric acid are consecutively mixed in under nitrogen. The resultant mixture is warmed at 50° for 30 minutes, following which it is stripped of solvent by vacuum distillation. The residue is consecutively mixed with 2000 parts of benzene and 1750 parts of hexane, whereupon the insoluble estrone is filtered therefrom and consecutively washed on the filter with 1:1 benzene-hexane, methanol, water, and methanol. The combined filtrate and washes are extracted with aqueous 5% potassium hydroxide. Acidification of the extract affords additional estrone. The total yield of product by this procedure is relatively modest.

*Example 27*

Changing the operating temperature from 18–20° to approximately 35° but otherwise duplicating the procedure of Example 26 affords an improved yield of product melting at 249–253°.

*Example 28*

Changing the operating temperature from 18–20° to approximately 50° but otherwise duplicating the procedure of Example 26 affords a substantially optimal yield of estrone. The product melts at 248–251°.

*Example 29*

A mixture of 21 parts of lithium wire cut in ¼″ lengths, 268 parts of phenanthrene, 128 parts of diphenylmethane, and 1800 parts of tetrahydrofuran is warmed with vigorous agitation under nitrogen while a muddy green color develops. The mixture is heated at the boiling point under reflux with vigorous agitation and protected by nitrogen while a solution of 250 parts of androsta-1,4-diene-3,17-dione 17-ethylene ketal in 810 parts of warm tetrahydrofuran is introduced at a rate such that the green color is not discharged (30 minutes required). At this point, 200 parts of methanol, 500 parts of water, and 300 parts of concentrated hydrochloric acid are consecutively mixed in under nitrogen. The resultant mixture is warmed at 55° for 20 minutes, following which it is stripped of solvent by vacuum distillation. The residue is consecutively mixed with 675 parts of benzene and 525 parts of hexane, whereupon insoluble estrone is filtered off, washed with methanol, and dried in warm air. Extraction of the combined filtrate and wash with aqueous 5% potassium hydroxide, followed by acidification of the extract, affords additional product. The estrone thus obtained melts at 245–255°. Total yield is 82% theory.

Example 30

A mixture of 31 parts of lithium wire cut in ¼" lengths, 370 parts of o-terphenyl, 260 parts of diphenylmethane, and 5400 parts of tetrahydrofuran is heated to boiling under reflux with vigorous agitation in a nitrogen atmosphere while a deep green color develops. Boiling under reflux with vigorous agitation and protected by nitrogen is continued while a solution of 500 parts of androsta-1,4-diene-3,17-dione 17-ethylene ketal in 2250 parts of tetrahydrofuran is introduced at a rate such that the green color is not discharged. Then, 800 parts of methanol, 2000 parts of water, and 1200 parts of concentrated hydrochloric acid are consecutively mixed in under nitrogen. The mixture is warmed at 60° for 30 minutes, following which it is stripped of solvent by vacuum distillation. The residue is suspended in 1130 parts of benzene, whereupon 875 parts of hexane is mixed in and the mixture allowed to stand while estrone separates. The estrone, isolated by filtration, washed with methanol and water, and dried in warm air, melts at 253–259° (corr.). Extraction of the combined filtrate and washes with aqueous 5% potassium hydroxide, followed by acidification of the extract affords additional product. Total yield is 72% theory.

Example 31

A mixture of 64 parts of a 50% dispersion of lithium in paraffin, 700 parts of p-terphenyl, 256 parts of diphenylmethane, and 2700 parts of tetrahydrofuran is heated to the boiling point with vigorous agitation in a nitrogen atmosphere. Initially, a black-green color develops, which changes to dark green as the temperature approaches the boiling point. Boiling under reflux with vigorous agitation and protected by nitrogen is continued while a solution of 500 parts of androsta-1,4-diene-3,17-dione 17-ethylene ketal in approximately 1500 parts of hot tetrahydrofuran is added during the course of ½ hour. The green color fades during the addition, the mixture becomes darker, and by the time all of the ketal has been introduced it is no longer possible to detect a greenish cast. At this point, 800 parts of methanol, 1000 parts of water, and 840 parts of concentrated hydrochloric acid are consecutively mixed in under nitrogen. The resultant mixture is warmed at around 60° for 30 minutes, then stripped of solvent by vacuum distillation. The residue is suspended in 2250 parts of benzene, following which the insoluble solids are filtered off, consecutively rinsed with benzene and methanol, and extracted with 5% potassium hydroxide in 2:1 water-methanol. Acidification of the extract affords a finely-divided precipitate of estrone which, isolated by filtration, washed with water, and dried in warm air, sinters in the range 220–250° and melts at 250–258°. Extraction of the original benzene filtrate with aqueous potassium hydroxide and acidification of the extract affords an additional crop of estrone. The total yield of product is 68% theory.

Example 32

A mixture of 21 parts of lithium wire cut in ¼" lengths, 265 parts of anthracene, 128 parts of diphenylmethane, and 1800 parts of tetrahydrofuran is warmed with vigorous agitation under nitrogen while a deep blue color develops. The mixture is heated at the boiling point under reflux with vigorous agitation and protected by nitrogen while a solution of 250 parts of androsta-1,4-diene-3,17-dione 17-ethylene ketal in 810 parts of warm tetrahydrofuran is introduced at a rate such that the color is not discharged, though it changes to muddy green (30 minutes). At this point, 200 parts of methanol, 500 parts of water, and 300 parts of concentrated hydrochloric acid are consecutively mixed in under nitrogen. The resultant mixture is warmed at 55° for 20 minutes, following which it is stripped of solvent by vacuum distillation. The residue is consecutively mixed with 675 parts of benzene and 525 parts of hexane. No estrone separates. The mixture is extracted with aqueous 5% potassium hydroxide. Acidification affords estrone melting at 245–260°. The yield is 17% theory.

Example 33

To a solution of 463 parts of acenaphthene in 2700 parts of tetrahydrofuran under nitrogen is added, with vigorous agitation, 28 parts of lithium wire cut in ¼" lengths. The reaction mixture becomes muddy green in color. It is heated to the boiling point under reflux and still protected by nitrogen while 260 parts of diphenylmethane and then a solution of 500 parts of androsta-1,4-diene-3,17-dione 17-ethylene ketal in 2250 parts of tetrahydrofuran are added with vigorous agitation, the ketal addition requiring approximately 30 minutes. When about ½ the ketal has been introduced, 10 more parts of finely-cut lithium wire is added to insure maintenance of the green color. To the resultant mixture are consecutively added, with continued vigorous agitation and protected by nitrogen, 400 parts of methanol, 1000 parts of water, and 600 parts of concentrated hydrochloric acid. The resultant mixture is warmed at 60° for 30 minutes, then stripped of solvent by vacuum distillation. The residual oil is dissolved in a mixture of benzene and hexane (1170 and 910 parts, respectively). No solid separates. Extraction of the solution with aqueous 5% potassium hydroxide and acidification of the extract affords a gummy precipitate of estrone which, filtered off and consecutively washed with methanol and ether, then dried in air, sinters at 250° and melts at 255–260°. The yield is approximately 6% theory.

Example 34

To a mixture of 490 parts of fluoranthene with 2700 parts of tetrahydrofuran under nitrogen is added, with vigorous agitation, 28 parts of lithium wire cut in short pieces. The resultant green mixture is heated at the boiling point under nitrogen with vigorous agitation while 260 parts of diphenylmethane is introduced, followed by a solution of 480 parts of androsta-1,4-diene-3,17-dione 17-ethylene ketal in 2250 parts of tetrahydrofuran at a rate such that the green color is continuously maintained. Approximately 30 minutes are required for the ketal addition. At this point, 400 parts of methanol, 1000 parts of water, and 600 parts of concentrated hydrochloric acid are consecutively mixed in under nitrogen. The resultant mixture is heated at 60° for 30 minutes, then stripped of solvent by vacuum distillation. The residue is dissolved in a mixture of 1170 parts of benzene and 910 parts of hexane. No solid precipitates from the solution. The solution is extracted with aqueous 5% potassium hydroxide, and the extract is acidified. Crystalline estrone is thrown down. The product is recovered on a filter, washed thereon with ether, and dried in air. It melts in the range 240–260°. The yield is approximately 7% theory.

Example 35

A mixture of 12 parts of lithium wire cut in ¼" lengths, 82 parts of recrystallized naphthalene, 51 parts of diphenylmethane, and approximately 1100 parts of tetrahydrofuran is heated to boiling under reflux with vigorous agitation in a nitrogen atmosphere while a deep green color develops. Boiling under reflux with vigorous agitation and protected by nitrogen is continued while a solution of 100 parts of androsta-1,4-diene-3,17-dione 17-ethylene ketal in 450 parts of tetrahydrofuran is added at a rate such that the green color is never discharged (20 minutes required), and for 20 minutes thereafter. Then, 160 parts of methanol, 300 parts of water, and 150 parts of concentrated hydrochloric acid are consecutively mixed in under nitrogen. The resultant mixture is maintained with agitation at its own temperature for 1 hour, whereupon solvent is removed by vacuum distillation. The residue is suspended in 210 parts of ether, and the suspension is allowed to stand until separation of estrone is complete. The product is filtered off, rinsed on the filter with 1:1 ether methanol, and dried in air. Extraction of the combined filtrate and rinse with aqueous potassium hydroxide, followed by acidification of the extract, affords additional product. Yield is 78% theory.

Example 36

Substitution of 273 parts of benzophenone for the anthracene called for in Example 32, and use of 28 parts of lithium wire, 600 parts of methanol, and 2000 parts of water rather than the amounts of these materials specified therein affords, by a procedure otherwise identical, approximately 8% the theoretical yield of estrone melting at 252–257°.

Example 37

A mixture of 14 parts of lithium wire cut in ¼" lengths, 160 parts of biphenyl, 85 parts of diphenylmethane, and approximately 870 parts of 1,2-dimethoxyethane preliminarily distilled over potassium is heated to boiling under reflux with vigorous agitation in a nitrogen atmosphere while a deep green color develops. Boiling under reflux with vigorous agitation and protected by nitrogen is continued while a slurry of 160 parts of androsta-1,4-diene-3,17-dione 17-ethylene ketal in approximately 870 parts of 1,2-dimethoxyethane is introduced at a rate such that the color remains undischarged (50 minutes required), and for 10 minutes thereafter. Then, 160 parts of methanol, 400 parts of water, and 360 parts of concentrated hydrochloric acid are consecutively mixed in under nitrogen. The mixture thus obtained is warmed for ½ hour and then stripped of solvent by vacuum distillation. The residue is suspended in 700 parts of hexane and the suspension set aside until precipitation of estrone is complete. The estrone is collected on a filter, rinsed thereon with hexane and methanol, and dried in air. It melts 250–254° (corr.). Extraction of the combined filtrate and rinses with aqueous potassium hydroxide, followed by acidification of the extract, affords adidtional product. Total yield is around 72% theory.

Example 38

Approximately 23 parts of lithium wire in small pieces is vigorously agitated with a solution of 94 parts of biphenyl and 52 parts of diphenylmethane in 510 parts of 2-methyltetrahydrofuran at room temperatures under nitrogen until a deep green color develops, whereupon the reactants are refluxed with vigorous agitation under nitrogen while a solution of 100 parts of androsta-1,4-diene-3,17-dione 17-ethylene ketal in 420 parts of hot 2-methyltetrahydrofuran is added during 1 hour. Within the first 10 minutes of heating, the color changes to a muddy green, probably as a result of interaction between 2-methyltetrahydrofuran and lithium-biphenyl. When approximately ¼ of the ketal solution has been added, the green fades to a reddish-brown. The resultant mixture is consecutively mixed under nitrogen with 80 parts during the ketal addition, and reappears only slowly. By of methanol, 200 parts of water, and approximately 360 parts of concentrated hydrochloric acid. The mixture thus obtained is warmed at 60° for 30 minutes, following which it is stripped of solvent by vacuum distillation. The residue is suspended in 225 parts of benzene, whereupon 175 parts of hexane is mixed in and the mixture allowed to stand while estrone separates. The estrone, isolated by filtration, washed with methanol, and dried in warm air, melts at 250–259°.

Example 39

Approximately 28 parts of lithium wire in small pieces is vigorously agitated with a solution of 308 parts of biphenyl and 140 parts of diphenylmethane in 255 parts of 2-methyltetrahydrofuran at about 5° under nitrogen until a deep green color appears, whereupon the reactants are chilled at 0–3° with vigorous agitation under nitrogen while a solution of 328 parts of androsta-1,4-diene-3,17-dione 17-ethylene ketal in a mixture of 175 parts of 2-methyltetrahydrofuran and 45 parts of benzene is added during 70 minutes. The green color is easily discharged the time all of the ketal has been added, the reaction mixture has become brown. However, it becomes green again after stirring 5 more minutes. At this point, 800 parts of methanol, 2000 parts of water, and 1200 parts of concentrated hydrochloric acid are consecutively mixed in under nitrogen. The resultant mixture is warmed at 60° for 30 minutes, then stripped of solvent by vacuum distillation. The residue is mixed with 900 parts of benzene and 700 parts of hexane. Insoluble solids are filtered off and discarded, since infrared analysis and the melting point indicate they are not estrone. The filtrate is extracted with aqueous 5% potassium hydroxide, and the extract is acidified. A small amount of crude estrone (M.P. 255–258°) is precipitated.

Example 40

(A) A mixture of 284 parts of androsta-1,4-diene-3,17-dione, 284 parts of 1,2-propanediol, 1 part of p-toluenesulfonic acid and 2560 parts of benzene is heated at the boiling point under reflux with agitation for two hours, water being removed as formed. The reaction mixture is then cooled and neutralized with aqueous 10% potassium bicarbonate, whereupon the benzene phase is separated, washed with water, and stripped of solvent by vacuum distillation. Trituration of the residue with ether affords androsta-1,4-diene-3,17-dione 17-propylene ketal melting at 161–167° (corr.).

(B) Estrone of comparable yield and purity to that obtained, for instance, by the procedure of Example 17 is produced by substituting for the 700 parts of androsta-1,4-diene-3,17-dione 17-ethylene ketal therein 729 parts of androsta-1,4-diene-3,17-dione 17-propylene ketal.

Example 41

(A) Substitution of 284 parts of 1,3-propanediol and 1750 parts of hexane for the 1,2-propanediol and 256 parts of benzene, respectively, called for in Example 40A affords, by the procedure there detailed, androsta-1,4-diene-3,17-dione 17-trimethylene ketal melting at 118–123° (corr.).

(B) Estrone of comparable yield and purity to that obtained, for instance, by the procedure of Example 17 is produced by substituting for the 700 parts of androsta-1,4-diene-3,17-dione 17-ethylene ketal called for therein 729 parts of androsta-1,4-diene-3,17-dione 17-trimethylene ketal.

Example 42

(A) A mixture of 284 parts of androsta-1,4-diene-3,17-dione, 416 parts of 2,2-dimethyl-1,3-propanediol, 10 parts of p-toluenesulfonic acid, and 5200 parts of benzene is heated at the boiling point under reflux with agitation for 2½ hours, water being removed as formed. The reaction mixture is then cooled, and 500 parts of aqueous 10% potassium bicarbonate is added thereto. The benzene phase is separated, washed with water, dried over anhydrous sodium sulfate, and stripped of solvent by vacuum distillation. The residue, recrystallized from 1:3 water-methanol, affords androsta-1,4-diene-3,17-dione 17-(2′,2′-dimethyltrimethylene)ketal melting at 150–152° (corr.).

(B) Estrone of comparable yield and purity to that obtained, for instance, by the procedure of Example 17 is produced by substitution for the 700 parts of androsta-1,4-diene-3,17-dione 17-ethylene ketal called for therein 778 parts of androsta-1,4-diene-3,17-dione 17-(2′,2′-dimethyltrimethylene)ketal.

*Example 43*

A mixture of 147 parts of lithium wire cut in ¼″ lengths, 1080 parts of biphenyl, 588 parts of diphenylmethane, and 5400 parts of tetrahydrofuran is heated to boiling under reflux with vigorous agitation in a nitrogen atmosphere while a green color develops. Boiling under reflux with vigorous agitation and protected by nitrogen is then continued while a solution of 1000 parts of androsta-1,4-diene-3,17-dione in 2925 parts of warm tetrahydrofuran is introduced at a rate such that the green color is not discharged, approximately 30 minutes being required. Thereupon, 1600 parts of methanol, 4000 parts of warm water, and 3000 parts of concentrated hydrochloric acid are consecutively mixed in under nitrogen. Solvent is stripped by vacuum distillation, leaving a residue which is mixed with 2250 parts of benzene and 1750 parts of hexane. The organic phase is separated (there being no crystalline solids present), and stripped of solvent by vacuum distillation. The residue thus obtained is taken up in 7500 parts of chloroform. The chloroform solution is extracted with aqueous 5% potassium hydroxide. Upon acidification, a solid precipitates which, filtered off, washed with methanol, and dried in air, melts in the range of 210–234°. The mixture thus isolated consists largely of estrone and estradiol, the latter being a mixture of the 17-epimers.

*Example 44*

A mixture of 14 parts of lithium wire cut in ¼″ lengths, 160 parts of biphenyl, 85 parts of diphenylmethane, and 1800 parts of tetrahydrofuran is heated to boiling under reflux with vigorous agitation in a nitrogen atmosphere while a deep green color develops. Boiling under reflux with vigorous agitation and protected by nitrogen is continued while a solution of 143 parts of 17β-hydroxyandrosta-1,4-dien-3-one in 630 parts of tetrahydrofuran is added at a rate such that the green color is not discharged, approximately 40 minutes being required. A solid precipitates in process. The reactants are consecutively mixed under nitrogen with 400 parts of methanol, 500 parts of water, and 300 parts of concentrated hydrochloric acid. The resultant mixture is warmed at 60° for 30 minutes, then stripped of solvents by vacuum distillation. The residue is consecutively mixed with 900 parts of benzene and 700 parts of hexane. Insoluble 17β-estradiol is filtered off, washed on the filter with methanol, and dried in air. Extraction of the combined filtrate and wash with aqueous potassium hydroxide, followed by acidification of the extract, affords additional product.

*Example 45*

(A) To a solution of 143 parts of 17β-hydroxyandrosta-1,4-dien-3-one in 1340 parts of dichloromethane is added 180 parts of dihydropyran and 1 part of p-toluenesulfonic acid. The resultant mixture is warmed to 35°, whereupon it is allowed to stand overnight, then washed with water, dried over potassium carbonate, and stripped of solvent by vacuum distillation. The residue is 17β-(2′-tetrahydropyranyloxy)androsta-1,4-dien-3-one.

(B) Substitution of 185 parts of 17β-(2′-tetrahydropyranyloxy)androsta-1,4-dien-3-one for the 17β-hydroxyandrosta-1,4-dien-3-one called for in Example 44 affords, by the procedure there detailed, a somewhat better yield of 17β-estradiol.

*Example 46*

A mixture of 10 parts of lithium wire cut in small pieces, 100 parts of biphenyl, 54 parts of diphenylmethane, and 900 parts of tetrahydrofuran is heated to boiling under reflux with vigorous agitation in a nitrogen atmosphere while the characteristic deep color develops. Boiling under reflux with vigorous agitation and protected by nitrogen is continued while a solution of 100 parts of 17α-ethyl-17β-hydroxyandrosta-1,4-dien-3-one in 675 parts of hot tetrahydrofuran is introduced during 35 minutes, and for 15 minutes thereafter. Approximately 240 parts of methanol, 80 parts of water, and 100 parts of glacial acetic acid and thereupon consecutively mixed in under nitrogen. The organic solvents are removed by vacuum distillation, and the residue is titurated with 350 parts of ether. The insoluble solid is 17α-ethylestra-1,3,5(10)-triene-3,17β-diol, which is isolated by filtration, further purified by washing on the filter with ether and water, and dried in air.

*Example 47*

(A) A stainless steel fermentation tank is charged with a nutrient medium consisting of 75 parts of commercial beef extract, 125 parts of commercial peptone, 3 parts of silicone antifoaming agent, and 30,000 parts of water. Tank and medium are sterilized by heating to temperatures of the order of 110–120° and then cooled to about 25°, whereupon an inoculant prepared by adding a culture of *Corynebaterium simplex* A.T.C.C. No. 6946 to a sterile medium consisting of 6 parts of commercial beef extract, 10 parts of commercial peptone, and 2000 parts of water and incubating the resultant mixture 72 hours at 25° is introduced. The medium is maintained at about 25° for 24 hours, during which time a stream of sterile air is passed through at the rate of about 5000 parts by volume per minute, and the developing culture is agitated to produce submerged growth. A solution of 10 parts of 22α-spirost-4-en-3-one in 250 parts of acetone is then introduced, and agitation with aeration at about 25° is thereupon resumed for 24 hours. The mixture thus obtained is extracted with dichloromethane. The extract is dried over anhydrous sodium sulfate and stripped of solvent by distillation. The residue is 22α-spirosta-1,4-dien-3-one.

(B) A mixture of 33 parts of a 30% dispersion of lithium in paraffin, 154 parts of biphenyl, 84 parts of diphenylmethane, and 900 parts of tetrahydrofuran is heated to boiling under reflux with vigorous agitation in a nitrogen atmosphere while the characteristic deep color develops. Boiling under reflux with vigorous agitation and protected by nitrogen is continued while a solution of 205 parts of 22α-spirosta-1,4-dien-3-one in 900 parts of warm tetrahydrofuran is introduced during ½ hour, and for 15 minutes thereafter. Then, 320 parts of methanol and 500 parts of water are consecutively introduced, whereupon the mixture is cooled to room temperature and acidified with 1000 parts of 10% acetic acid. Organic solvents are removed by vacuum distillation, and the residue is triturated with ether. In soluble solids are 19-nor-22α-spirosa-1,3,5(10)-trien-3-ol which, isolated by filtration, washed on the filter with ether and water, and dried in air, melts at 236–242°.

*Example 48*

A mixture of 10 parts of potassium, 50 parts of naphthalene, and 225 parts of benzene is heated at the boiling point under reflux with vigorous agitation in a nitrogen atmosphere until a blue color develops. Boiling under reflux with vigorous agitation and protected by nitrogen is continued while a solution of 25 parts of androsta-1,4-diene-3,17-dione 17-ethylene ketal in 90 parts of benzene is added at a rate such that the blue color is never discharged (20 minutes required), and for 30 minutes thereafter. Then, 40 parts of methanol, 200 parts of water, and 120 parts of concentrated hydrochloric acid are consecutively mixed in under nitrogen. The resultant mixture is warmed at around 60° for 30 minutes, following which the benzene phase is separated, washed with water, and extracted with aqueous 5% potassium hydroxide. Upon acidification of the alkaline extract, estrone precipitates.

*Example 49*

A mixture of 35 parts of sodium, 41 parts of naphthalene, 26 parts of diphenylmethane, and 300 parts of specially purified dioxane is heated at the boiling point under reflux with vigorous agitation in a nitrogen atmosphere until a deep blue-green color develops. [N.B. "specially purified" as used in this and succeeding examples denotes solvent which is preliminarily distilled from a mixture of activated alumina and anhydrous sodium hydroxide, then mixed at room temperature with potassium until any reaction subsides, and thereupon heated to boiling or 150° (whichever is lower) with vigorous agitation for 30 minutes. At this point, naphthalene is introduced; and agitation is continued until the characteristic green adduct color develops, whereupon the solvent is distilled.] Boiling under reflux with vigorous agitation and protected by nitrogen is continued while a solution of 50 parts of androsta - 1,4 - diene - 3,17 - dione 17 - ethylene ketal in 200 parts of dioxane is introduced at a rate such that the blue-green color is not discharged, approximately 1 hour being required. Then, 40 parts of methanol, 200 parts of water, and 180 parts of concentrated hydrochloric acid are consecutively mixed in under nitrogen. The resultant mixture is warmed at around 60° for 30 minutes, following which it is stripped of solvent by vacuum distillation. The residue is mixed with 135 parts of benzene, and the mixture is allowed to stand while separation of estrone continues. The estrone is isolated by filtration. Extraction of the filtrate with aqueous potassium hydroxide, followed by acidification of the extract, affords additional product.

*Example 50*

A mixture of 80 parts of lithium wire cut in small pieces, 940 parts of technical dimethylnaphthalene, 520 parts of diphenylmethane, and 5400 parts of tetrahydrofuran is heated to boiling under reflux with vigorous agitation in a nitrogen atmosphere while the characteristic color develops. Boiling under reflux with vigorous agitation and protected by nitrogen is continued while a solution of 1000 parts of androsta - 1,4 - diene - 3,17-dione 17-ethylene ketal in approximately 2900 parts of warm tetrahydrofuran is added over 45 minutes, and for 15 minutes thereafter. Then, 800 parts of methanol, 2000 parts of water, and 1200 parts of concentrated hydrochloric acid are consecutively mixed in under nitrogen. The resultant mixture is warmed at 60° for 30 minutes, following which it is stripped of solvent by vacuum distillation. The residue is suspended in 2250 parts of benzene, whereupon 1750 parts of hexane is mixed in and the mixture allowed to stand briefly while estrone separates. The estrone is filtered off and consecutively washed with 1:1 benzene-hexane, methanol, water, and methanol. Dried in warm air, it melts at 249–256°. Extraction of the combined filtrate and washes with aqueous potassium hydroxide, followed by acidification of the extract, affords additional product.

*Example 51*

Substitution of 95 parts of lithium and 862 parts of 2,6 - dimethylnaphthalene for the 80 parts of lithium and 940 parts of technical dimethylnaphthalene, respectively, called for in the preceding Example 50 affords, by the procedure there detailed, estrone of comparable purity in somewhat better yield. The product melts at 250–255°.

*Example 52*

A mixture of 64 parts of a 50% dispersion of lithium in paraffin, 470 parts of biphenyl, 256 parts of diphenylmethane, and 2700 parts of tetrahydrofuran is heated to boiling under nitrogen with vigorous agitation while a deep green color develops. Boiling under reflux with vigorous agitation and protected by nitrogen is continued while a solution of 500 parts of androsta - 1,4 - diene- 3,17 - dione 17 - ethylene ketal in approximately 1500 parts of warm benzene is added at a rate such that the characteristic color is not discharged (20 minutes required), and for 15 minutes thereafter. Then, 800 parts of methanol, 1000 parts of water, and 840 parts of concentrated hydrochloric acid are consecutively introduced under nitrogen. The resultant mixture is warmed at 60° for 30 minutes, following which organic solvents are removed by distillation. The residue is mixed with 1125 parts of benzene and 875 parts of hexane. This mixture is chilled and the estrone which separates collected on a filter, washed thereon with methanol, and dried in air. Extraction of the combined filtrate and wash with aqueous potassium hydroxide, followed by acidification of the extract, affords additional product. The estrone thus prepared melts at 245–256°.

*Example 53*

A mixture of 64 parts of a 50% dispersion of lithium in paraffin, 470 parts of biphenyl, 256 parts of diphenylmethane, and 2700 parts of methyl tetrahydrofurfuryl ether is heated to 65° under nitrogen with vigorous agitation (the characteristic deep blue-green color forms at once) and maintained thus while a solution of 500 parts of androsta - 1,4 - diene - 3,17 - dione 17 - ethylene ketal in approximately 1200 parts of warm benzene is added at a rate such that the color is not discharged (25 minutes required), and for 15 minutes thereafter. Thereupon, 800 parts of methanol, 1000 parts of water, and 960 parts of concentrated hydrochloric acid are consecutively mixed in under nitrogen; and the resultant mixture is warmed at 50° for 30 minutes. The mixture is then stripped of solvent by vacuum distillation, and the residue is consecutively mixed with 1125 parts of benzene and 875 parts of hexane. The estrone which has separated is filtered from the chilled mixture, washed with 1:1 benzene-hexane and then with methanol, and finally dried in warm air. It melts at 255–259°. Extraction of the combined filtrate and washes with aqueous potassium hydroxide, followed by acidification of the extract, affords additional product.

*Example 54*

A mixture of 25 parts of a 40% dispersion of lithium in paraffin, 50 parts of biphenyl, 26 parts of diphenylmethane, and 285 parts of specially purified (see Example 49) bis(2-methoxyethyl) ether ("diglyme") is heated at 120° with vigorous agitation under nitrogen until a green color develops, and maintained thus while a solution of 25 parts of androsta-1,4-diene-3,17-dione 17-ethylene ketal in 245 parts of bis(2-methoxyethyl) ether is added during 90 minutes. Then, 40 parts of methanol, 200 parts of water, and 150 parts of concentrated hydrochloric acid are consecutively mixed in under nitrogen. The resultant mixture is warmed at 60° for 30 minutes, following which it is stripped of solvent by vacuum distillation. The residue is partitioned between benzene and aqueous 5% potassium hydroxide. Upon acidification of the potassium hydroxide phase, estrone precipitates.

*Example 55*

A mixture of 35 parts of potassium, 95 parts of biphenyl, 52 parts of diphenylmethane, and 540 parts of tetrahydrofuran is heated to boiling under reflux with vigorous agitation in a nitrogen atmosphere while a deep blue color develops. Boiling under reflux with vigorous agitation and protected by nitrogen is continued while a solution of 100 parts of androsta-1,4-diene-3,17-dione 17-ethylene ketal in approximately 290 parts of tetrahydrofuran is introduced at a rate such that the blue color is continuously maintained, approximately 15 minutes being required. To the mixture is then consecutively added 80 parts of methanol, 150 parts of water, and 120 parts of concentrated hydrochloric acid with vigorous agitation under nitrogen. The resultant mixture is heated at 60° for 30 minutes, following which it is stripped of solvent by vacuum distillation. The residue is suspended in 180 parts of benzene, whereupon 140 parts of hexane is mixed in and the mixture allowed to stand briefly while estrone precipitates. The estrone, isolated by filtration, washed with methanol, and dried in warm air, melts at 248–253° (corr.). Extraction of the combined filtrate and wash with aqueous potassium hydroxide and acidification of this extract affords additional product.

*Example 56*

(A) A mixture of 1 part of androsta-1,4-diene-3,17-dione, 766 parts of trimethyl orthoformate, 10 parts of p-toluenesulfonic acid, and 400 parts of methanol is heated at the boiling point under reflux with agitation for 30 minutes, then cooled to room temperature and diluted with approximately 400 parts of 10% methanolic potassium hydroxide. The resultant solution is allowed to evaporate until crystallization begins, at which point evaporation is halted and crystallization allowed to proceed to completion. The crystals are filtered off and washed with 800 parts of cold methanol. The product thus isolated is androsta-1,4-diene-3,17-dione 17,17-dimethyl ketal.

(B) A mixture of 25 parts of a 30% dispersion of lithium in paraffin, 95 parts of biphenyl, 52 parts of diphenylmethane, and 540 parts of tetrahydrofuran is heated to boiling under reflux with vigorous agitation in a nitrogen atmosphere while a dark green color develops. Boiling under reflux with vigorous agitation and protected by nitrogen is continued while a solution of 96 parts of androsta-1,4-diene-3,17-dione 17,17-dimethyl ketal in 270 parts of warm tetrahydrofuran is introduced at a rate such that the green color is always present, approximately 20 minutes being required. Consecutive introduction of 80 parts of methanol, 100 parts of water, and approximately 180 parts of concentrated hydrochloric acid under nitrogen, and subsequent stripping of solvent by vacuum distillation, affords a residue which is mixed with 180 parts of benzene and 130 parts of hexane. The crystalline product which forms is filtered off and washed with 80 parts of methanol. The estrone thus isolated is obtained in excellent yield. It melts at approximately 246–247° (corr.).

*Example 57*

(A) A mixture of 23 parts of androsta-1,4-diene-3,11,17-trione, approximately 17 parts of 1,2-ethanediol, 2 parts of p-toluenesulfonic acid monohydrate, and 1800 parts of benzene is heated at the boiling point under reflux with agitation for 2 hours, water being removed as formed. The reaction mixture is then cooled, consecutively washed with aqueous sodium carbonate and water, dried over magnesium sulfate, and freed of solvent by vacuum distillation. Trituration of the residue with ether affords androsta-1,4-diene-3,11,17-trione 17-ethylene ketal melting at 213–215°.

(B) A solution of 5 parts of androsta-1,4-diene-3,11,17-trione 17-ethylene ketal and 10 parts of lithium tri-tert-butoxyaluminum hydride in 180 parts of tetrahydrofuran is stirred for 18 hours at room temperatures. To the resultant solution is consecutively added 180 parts of tetrahydrofuran, 70 parts of ether, 1 part of water, approximately 1 part of aqueous 20% sodium hydroxide, and 5 parts of water. The mixture thus obtained is allowed to stand 10 minutes, whereupon precipitated solids are filtered off and washed with chloroform. The filtrate is combined with the chloroform wash, and the resultant liquors dried over magnesium sulfate and stripped of solvent by vacuum distillation. The residue, triturated with ether, affords colorless crystals of 11β-hydroxyandrosta-1,4-diene-3,17-dione 17-ethylene ketal melting in the range, 175–185°.

(C) To a mixture of approximately 42 parts of a 30% dispersion of lithium in paraffin, 125 parts of biphenyl, approximately 69 parts of diphenylmethane, and 1080 parts of tetrahydrofuran is added, with vigorous agitation at the boiling point under reflux during 35 minutes, a hot solution of 100 parts of 11β-hydroxyandrosta-1,4-diene-3,17-dione 17-ethylene ketal in 765 parts of tetrahydrofuran. The resultant mixture is maintained at the boiling point under reflux for 10 minutes, whereupon 28 parts of methanol and 80 parts of water are consecutively and cautiously introduced. A further 400 parts of water is then added, following which tetrahydrofuran is removed by vacuum distillation. The residue is cooled to room temperature and diluted with approximately 700 parts of a 3:1 (by volume) mixture of benzene and hexane. The aqueous phase is thereupon separated and the organic phase washed repeatedly with 200-part portions of aqueous 5% potassium hydroxide. Aqueous phase and washings are then combined, washed twice with 200-part portions of hexane, and slowly added with vigorous agitation to a slurry of 200 parts of acetic acid, 200 parts of water, and 200 parts of ice, the temperature throughout being maintained below 10°. The solid precipitate thrown down is isolated by filtration, washed with water, and dried in vacuo to afford 3,11β-dihydroxyestra - 1,3,5(10)-trien-17-one 17-ethylene ketal which, recrystallized from a mixture of acetone and petroleum ether, melts at 186–191°.

(D) To a solution of 32 parts of 3,11β-dihydroxyestra-1,3,5(10)-trien-17-one 17-ethylene ketal in approximately 350 parts of a hot 3:1 (by volume) mixture of methanol and water is added approximately 4 parts of 15% hydrochloric acid. The resultant solution is heated at around 90° for a few moments while crystallization ensues. The resultant mixture is allowed to stand at room temperatures for 1 hour, whereupon it is cooled to around 5°. Insoluble solids are filtered off, washed with water, and dried in air to afford 3,11β-dihydroxyestra-1,3,5(10)-trien-17-one melting in the range 240–252°.

What is claimed is:

1. In a process for converting a steroidal 19-methyl-1, and dried in air to afford 3,11β-dihydroxyestra-1,3,5(10)-triene, the step which consists of contacting a member of the group consisting of compounds of the formulas

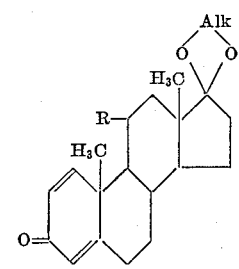

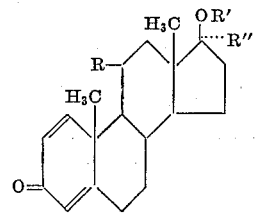

androsta-1,4-diene-3,-17-dione 17-17-dimethyl ketal, 11β-hydroxyandrosta-1,4-diene - 3,17 - dione 17,17 - dimethyl ketal, and 22α-spirosta-1,4-dien-3-one with a member of the group consisting of alkali metals and mixtures thereof in the presence of a solvent and a radical anion precursor, said solvent being a member of the group consisting of lower aliphatic ethers, fully alkylated polyhydric alcohols, acetals, cyclic ethers, tertiary amines, and benzene, said radical anion precursor being a member of the group consisting of biphenyl, naphthalene, methylnaphthalene, dimethylnaphthalene, phenanthrene, terphenyl, anthracene, acenaphthene, fluoranthene, dibenzofuran, and benzophenone, Alk in the first formula being an alkylene radial containing more than 1 and fewer than 6 carbon atoms and R therein being a member of the group consisting of hydrogen and hydroxyl and, in the second formula, R being defined as before, R' being a member of the group consisting of hydrogen and a tetrahydropyranyl radical, and R" being a member of the group consisting of hydrogen and a lower alkyl radical containing fewer than 3 carbon atoms.

2. In a process for converting a steroidal 19-methyl-1,4-dien-3-one to the corresponding 19-nor-3-oxy-1,3,5-(10)-triene, the step which consists of contacting a member of the group consisting of compounds of the formulas

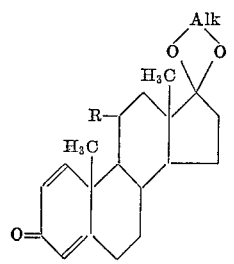

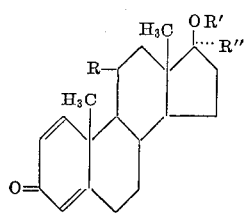

androsta-1,4-diene-3,17-dione 17,17-dimenthyl ketal, 11β-hydroxyandrosta-1,4-diene-3,17 - dione 17,17 - dimenthyl ketal, and 22α-spirosta-1,4-dien-3-one with a member of the group consisting of alkali metals and mixtures thereof in the presence of (a) a radical anion precursor selected from the group consisting of biphenyl, naphthalene, methylnaphthalene, dimethylnaphthalene, phenanthrene, terphenyl, anthracene, acenaphthene, fluoranthene, dibenzofuran, and benzopenone, (b) a scavenger selected from the group consisting of diphenylmethane and methylnaphthalene, and (c) a solvent selected from the group consisting of lower aliphatic ethers, fully alkylated polyhydric alcohols, acetals, cyclic ethers, tertiary amines, and benzene Alk in the first formula being an alkylene radical containing more than 1 and fewer than 6 carbon atoms and R therein being a member of the group consisting of hydrogen and hydroxyl and, in the second formula, R being defined as before, R' being a member of the group consisting of hydrogen and a tetrahydropyranyl radical, and R" being a member of the group consisting of hydrogen and a lower alkyl radical containing fewer than 3 carbon atoms.

3. In a process for converting an androsta-1,4-dien-3-one to the corresponding 3-oxyestra-1,3,4(10)-triene, the steps which consist of (1) mixing an alkali metal with a radical anion precursor selected from the group consisting of biphenyl, naphthalene, methylnaphthalene, phenanthrene, and terphenyl in the presence of a solvent selected from the group consisting of lower aliphatic ethers, fully alkylated polyhydric alcohols, acetals, cyclic ethers, tertiary amines, and benzene and (2) mixing therewith a member of the group consisting of androsta-1,4-diene-3,17-dione 17,17-dimethyl ketal, 11β-hydroxyandrosta-1,4-diene-3,17-dione 17,17-dimethyl ketal, and ketals of the formula

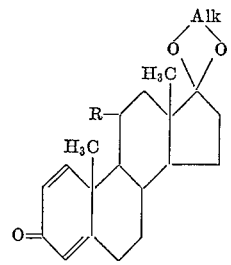

in an inert solvent, Alk in the formula being an alkylene radical containing more than 1 and fewer than 6 carbon atoms and R therein being a member of the group consisting of hydrogen and hydroxyl.

4. In a process for converting an androsta-1,4-dien-3-one to the corresponding 3-oxyestra-1,3,5(10)-triene, the steps which consist of (1) mixing an alkali metal with a radical anion precursor selected from the group consisting of biphenyl, naphthalene, methylnaphthalene, phenanthrene, and terphenyl in the presence of (a) a solvent selected from the group consisting of lower aliphatic ethers, fully alkylated polyhydric alcohols, acetals, cyclic ethers, tertiary amines, and benzene and (b) a scavenger selected from the group consisting of diphenylmethane and methylnaphthalene and (2) mixing therewith a member of the group consisting of androsta-1,4-diene-3,17-dione 17,17-dimethyl ketal, 11β-hydroxyandrosta-1,4-diene-3,17-dione 17,17-dimethyl ketal, and ketals of the formula

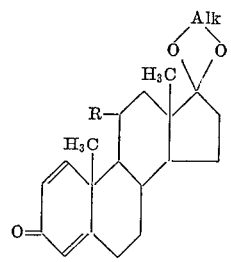

in an inert solvent, Alk in the formula being an alkylene radical containing more than 1 and fewer than 6 carbon atoms and R therein being a member of the group consisting of hydrogen and hydroxyl.

5. In a process for converting an androsta-1,4-dien-3-one to the corresponding 3-oxyestra-1,3,5(10)-triene, the steps which consist of (1) mixing an alkali metal with a radical anion precursor selected from the group consisting of biphenyl, naphthalene, methylnaphthalene, phenanthrene, and terphenyl in the presence of a solvent selected from the group consisting of lower aliphatic ethers, fully alkylated polyhydric alcohols, acetals, cyclic ethers, tertiary amines, and benzene and (2) mixing therewith a solution of (a) a member of the group consisting of androsta-1,4-diene-3,17-dione 17,17-dimethyl ketal, 11β-hydroxyandrosta - 1,4 - diene-3,17-dione-17,17-dimethyl ketal, and ketals of the formula

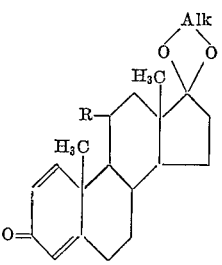

wherein Alk represents an alkylene radical containing more than 1 and fewer than 6 carbon atoms and R represents a member of the group consisting of hydrogen and hydroxyl and (b) a scavenger selected from the group consisting of diphenylmethane and methylnaphthalene in an inert solvent.

6. In a process for converting an androsta-1,4-dien-3-one to the corresponding 3-oxyestra-1,3,5(10)-triene, the step which consists of heating a member of the group consisting of androsta-1,4-diene-3,17-dione 17,17-dimethyl ketal, 11β-hydroxyandrosta-1,4-diene-3,17-dione 17,17-dimethyl ketal, and ketals of the formula

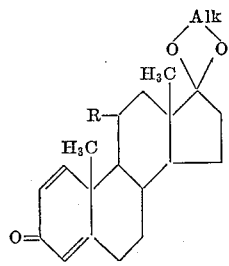

with an ankali metal in the presence of (a) a radical anion precursor selected from the group consisting of biphenyl, naphthalene, methylnaphthalene, phenanthrene, and terphenyl and (b) a solvent selected from the group consisting of tetrahydrofuran and 1,2-dimethoxyethane, Alk in the formula being an alkylene radical containing more than 1 and fewer than 6 carbon atoms and R therein being a member of the group consisting of hydrogen and hydroxyl.

7. In a process for converting an androsta-1,4-dien-3-one to the corresponding 3-oxyestra-1,3,5(10)-triene, the step which consists of heating a member of the group consisting of androsta-1,4-diene - 3,17-dione 17,17-dimethyl ketal, 11β-hydroxyandrosta - 1,4-diene-3,17-dione 17,17-dimethyl ketal, and ketals of the formula

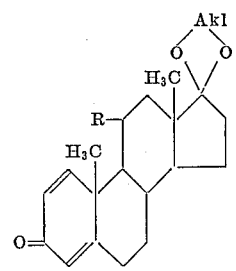

with an alkali metal in the presence of (a) a radical anion precursor selected from the group consisting of biphenyl, naphthalene, methylnaphthalene, phenanthrene, and terphenyl, (b) a scavenger selected from the group consisting of diphenylmethane and methylnaphthalene, and (c) a solvent selected from the group consisting of tetrahydrofuran and 1,2-dimethoxyethane, Alk in the formula being an alkylene radical containing more than 1 and fewer than 6 carbon atoms and R therein being a member of the group consisting of hydrogen and hydroxyl.

8. In a process for converting an androsta-1,4-dien-3-one to the corresponding 3-oxyestra - 1,3,5(10)-triene, the steps which consist of (1) mixing an alkali metal with a radical anion precursor selected from the group consisting of biphenyl, naphthalene, methylnaphthalene, phenanthrene, and terphenyl in the presence of a boiling solvent selected from the group consisting of tetrahydrofuran and 1,2-dimethoxyethane and (2) mixing therewith at the boiling point of the solvent (a) a member of the group consisting of androsta-1,4-diene-3,17-dione 17,17-dimethyl ketal, 11β-hydroxyandrosta-1,4-diene-3,17-dione 17,17-dimethyl ketal, and ketals of the formula

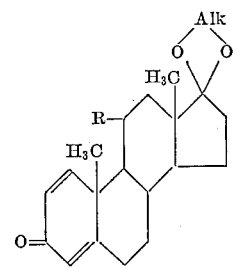

wherein Alk represents an alkylene radical containing more than 1 and fewer than 6 carbon atoms and R represents a member of the group consisting of hydrogen and hydroxyl, (b) a scavenger selected from the group consisting of diphenylmethane and methylnaphthalene, and (c) a solvent selected as before.

9. In a process for converting an androsta-1,4-dien-3-one to the corresponding 3-oxyestra-1,3,5(10)-triene, the steps which consist of (1) mixing an alkali metal with a radical anion precursor selected from the group consisting of biphenyl, naphthalene, methylnaphthalene, phenanthrene, and terphenyl in the presence of (a) a scavenger selected from the group consisting of diphenylmethane and methylnaphthalene and (b) a boiling solvent selected from the group consisting of tetrahydrofuran and 1,2-dimethoxyethane and (2) mixing therewith at the boiling point of the aforesaid solvent (a) a member of the group consisting of androsta-1,4-diene-3,17-dione 17,17-dimethyl ketal, 11β-hydroxyandrosta - 1,4-diene-3,17-dione 17,17-dimethyl ketal, and ketals of the formula

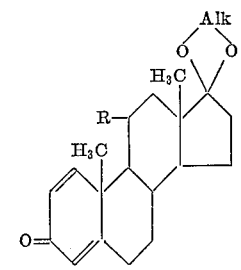

wherein Alk represents an alkylene radical containing more than 1 and fewer than 6 carbon atoms and R represents a member of the group consisting of hydrogen and hydroxyl and (b) a solvent selected as before.

10. In a process for converting an androsta-1,4-dien-3-one to the corresponding 3-oxyestra-1,3,5(10)-triene, the steps which consist of (1) mixing an alkali metal with a radical anion precursor selected from the group consisting of biphenyl, naphthalene, methylnapthalene, phenanthrene, and terphenyl in the presence of a boiling solvent selected from the group cosisting of tetrahydrofuran and 1,2-dimethoxyethane and (2) mixing with an excess of the resultant radical anion at the boiling point of the aforesaid solvent (a) a member of the group consisting of androsta - 1,4-diene - 3,17-dione 17,17-dimethyl ketal, 11β-hydroxyandrosta - 1,4-diene - 3,17-dione 17,17-dimethyl ketal, and ketals of the formula

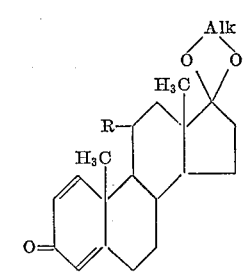

wherein Alk represents an alkylene radical containing more than 1 and fewer than 6 carbon atoms and R represents a member of the group consisting of hydrogen and hydroxyl (b) a scavenger selected from the group consisting of diphenylmethane and methylnaphthalene, and (c) a solvent selected as before.

11. The process of converting an androsta-1,4-dien-3-one to the corresponding 3-oxyestra-1,3,5(10)-triene which comprises mixing a solution of a member of the group consisting of androsta-1,4-diene-3,17-dione 17,17-dimethyl ketal, 11β-hydroxyandrosta-1,4-diene-3,17-dione 17,17-dimethyl ketal, and ketals of the formula

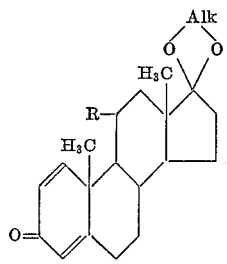

in an inert solvent with a boiling solution of diphenylmethane and the radical anion obtained by mixing lithium with biphenyl in the presence of boiling tetrahydrofuran, Alk in the formula being an alkylene radical containing more than 1 and fewer than 6 carbon atoms and R being a member of the group consisting of hydrogen and hydroxyl.

12. The process of converting androsta-1,4-diene-3,17-dione 17-ethylene ketal to the corresponding 3-oxyestra-1,3,5(10)-triene which comprises mixing a solution of the ketal in tetrahydrofuran under a nitrogen atmosphere with a boiling mixture of diphenylmethane and a continuous excess of the radical anion solution obtained by mixing a dispersion of lithium in paraffin with biphenyl in boiling tetrahydrofuran under nitrogen.

13. The process of converting androsta-1,4-diene-3,17-dione 17-ethylene ketal to the corresponding 3-oxyestra-1,3,5(10)-triene which comprises mixing a solution of the ketal in tetrahydrofuran under a nitrogen atmosphere with a boiling mixture of methylnaphthalene and a continuous excess of the radical anion solution obtained by mixing a dispersion of lithium in paraffin with biphenyl in boiling tetrahydrofuran under nitrogen.

14. The process of converting androsta-1,4-diene-3,17-dione 17-ethylene ketal to the corresponding 3-oxyestra-1,3,5(10)-triene which comprises mixing a solution of the ketal in tetrahydrofuran under a nitrogen atmosphere with a continuous excess of the radical anion solution obtained by mixing a dispersion of lithium in paraffin with methylnaphthalene in boiling tetrahydrofuran under nitrogen.

15. The process of converting androsta-1,4-diene-3,17-dione 17-ethylene ketal to the corresponding 3-oxyestra-1,3,5(10)-triene which comprises mixing a solution of the ketal in tetrahydrofuran under a nitrogen atmosphere with a boiling mixture of diphenylmethane and a continuous excess of the radical anion solution obtained by mixing a dispersion of lithium in paraffin with naphthalene in boiling tetrahydrofuran under nitrogen.

16. The process of converting androsta-1,4-diene-3,17-dione 17-ethylene ketal to the corresponding 3-oxyestra-1,3,5(10)-triene which comprises mixing a solution of the ketal in tetrahydrofuran under a nitrogen atmosphere with a boiling mixture of diphenylmethane and a continuous excess of the radical anion solution obtained by mixing a dispersion of lithium in paraffin with phenanthrene in boiling tetrahydrofuran under nitrogen.

17. The process of converting androsta-1,4-diene-3,17-dione 17-ethylene ketal to the corresponding 3-oxyestra-1,3,5(10)-triene which comprises mixing a solution of the ketal in tetrahydrofuran under a nitrogen atmosphere with a boiling mixture of diphenylmethane and a continuous excess of the radical anion solution obtained by mixing a dispersion of lithium in paraffin with terphenyl in boiling tetrahydrofuran under nitrogen.

18. The process of converting androsta-1,4-diene-3,17-dione 17,17-dimethyl ketal to the corresponding 3-oxyestra-1,3,5(10)-triene which comprises mixing a solution of the ketal in tetrahydrofuran under a nitrogen atmosphere with a boiling mixture of diphenylmethane and a continuous excess of the radical anion solution obtained by mixing a dispersion of lithium in paraffin with biphenyl in boiling tetrahydrofuran under nitrogen.

19. The process of converting a member of the group consisting of 17β-hydroxyandrosta-1,4-dien-3-one and its 17-tetrahydropyranyl ether to the corresponding 3-oxyestra-1,3,5(10)-triene which comprises heating a solution of said member in an inert solvent under nitrogen with a mixture of diphenylmethane and a continuous excess of the radical anion solution obtained by heating lithium with biphenyl in the presence of tetrahydrofuran under nitrogen.

20. The process of converting 22α-spirosta-1,4-dien-3-one to the corresponding 19-nor-3-oxy-22α-spirosta-1,3,5(10)-triene which comprises heating a solution of said 22α-spirosta-1,4-dien-3-one in an inert solvent under nitrogen with a mixture of diphenylmethane and a continuous excess of the radical anion solution obtained by heating lithium with biphenyl in the presence of tetrahydrofuran under nitrogen.

No references cited.

LEWIS GOTTS, *Primary Examiner.*

UNITED STATES PATENT OFFICE
CERTIFICATE OF CORRECTION

Patent No. 3,274,182                                          September 20, 1966

Hugh L. Dryden, Jr., et al.

It is hereby certified that error appears in the above numbered patent requiring correction and that the said Letters Patent should read as corrected below.

Column 1, lines 12 and 13, for "April 8, 1959" read -- March 4, 1963 --; column 2, line 24, strike out "The 3-oxyestra-1,3,5(10)-trienes produced by the process"; column 3, line 66, for "constiutes" read -- constitutes --; column 5, line 35, for "containnig" read -- containing --; line 52, for "conductive" read -- conducive --; column 18, line 2, strike out "during the ketal addition, and reappears only slowly. By" and insert the same after "reaction", in line 24, same column 18; line 19, for "at" read -- to --; column 20, line 65, for "In soluble" read -- Insoluble --; line 66, for "spirosa" read -- spirosta --; column 24, line 52, strike out "and dried in air to afford 3,11β-dihydroxyestra" and insert instead -- 4-dien-3-one to the corresponding 19-nor-3-oxy --; column 25, line 46, for "dimenthyl" read -- dimethyl --; line 68, for "1,3,4(10)-" read -- 1,3,5(10)- --; column 27, line 25, for "ankali" read -- alkali --.

Signed and sealed this 29th day of August 1967.

(SEAL)
Attest:

ERNEST W. SWIDER                                    EDWARD J. BRENNER
Attesting Officer                                Commissioner of Patents